United States Patent [19]

Loebig

[11] Patent Number: 5,751,574
[45] Date of Patent: May 12, 1998

[54] METHOD FOR LOADING SOFTWARE IN COMMUNICATION SYSTEMS WITH NON-REDUNDANT, DECENTRALIZED EQUIPMENT

[75] Inventor: Norbert Loebig, Darmstadt, Germany

[73] Assignee: Siemens Aktiengesellschaft, Munich, Germany

[21] Appl. No.: 711,776

[22] Filed: Sep. 10, 1996

[30] Foreign Application Priority Data

Sep. 13, 1995 [DE] Germany ........................ 195 33 961.4

[51] Int. Cl.⁶ ........................................ G05B 9/02
[52] U.S. Cl. .................. 364/187; 364/182; 364/184; 395/182.01; 395/482
[58] Field of Search ........................ 364/184, 187, 364/182, 180; 395/182.01, 482, 184.01, 185.01; 371/8.1, 29.1, 9; 370/58.3, 61, 217, 218, 219, 220, 221, 216; 379/265, 32, 200

[56] References Cited

U.S. PATENT DOCUMENTS

| | | | |
|---|---|---|---|
| 4,097,695 | 6/1978 | Grace et al. | 179/15 |
| 4,491,944 | 1/1985 | Caizerhues et al. | 370/58 |
| 4,634,110 | 1/1987 | Julich et al. | 371/11 |
| 4,658,359 | 4/1987 | Palatucci et al. | 364/424 |
| 4,943,919 | 7/1990 | Aslin et al. | 364/424.03 |
| 5,008,814 | 4/1991 | Mathur | 364/200 |
| 5,014,264 | 5/1991 | Nagler et al. | 370/58.1 |
| 5,051,982 | 9/1991 | Brown et al. | 370/58.2 |
| 5,067,153 | 11/1991 | Willie et al. | 380/23 |
| 5,155,837 | 10/1992 | Liu et al. | 395/500 |
| 5,200,958 | 4/1993 | Hamilton et al. | 371/16.4 |
| 5,233,607 | 8/1993 | Barwig et al. | 370/94.1 |
| 5,239,547 | 8/1993 | Tomiyama et al. | 371/64.4 |
| 5,251,302 | 10/1993 | Weigl et al. | 395/250 |
| 5,299,207 | 3/1994 | Fujii | 371/29.1 |
| 5,301,308 | 4/1994 | Daar et al. | 395/575 |
| 5,339,430 | 8/1994 | Lundin et al. | 395/700 |
| 5,396,552 | 3/1995 | Jahn et al. | 379/396 |
| 5,410,703 | 4/1995 | Nilsson et al. | 395/700 |
| 5,453,984 | 9/1995 | Mueller | 370/85.13 |
| 5,461,613 | 10/1995 | Loebig | 370/58.3 |
| 5,469,503 | 11/1995 | Butensky et al. | 379/265 |
| 5,490,138 | 2/1996 | Niestegge et al. | 370/56 |
| 5,506,988 | 4/1996 | Weber et al. | 395/650 |
| 5,513,312 | 4/1996 | Loebig | 395/182.01 |
| 5,548,640 | 8/1996 | Blondel et al. | 379/242 |
| 5,555,418 | 9/1996 | Nilsson et al. | 395/700 |
| 5,555,428 | 9/1996 | Nilsson et al. | 395/700 |
| 5,557,660 | 9/1996 | Crevits et al. | 379/215 |
| 5,574,870 | 11/1996 | Dziennus et al. | 395/309 |

FOREIGN PATENT DOCUMENTS 43 19 877 C1   6/1994   Germany.
44 22 805 C1   11/1995  Germany.

*Primary Examiner*—Reba I. Elmore
*Assistant Examiner*—Ramesh Patel
*Attorney, Agent, or Firm*—Hill & Simpson

[57] ABSTRACT

In a method for loading software in communication systems with non-redundant, decentralized equipment so that the availability of a communication system for the connected subscribers remains assured during the loading process of programs and data, there is a requirement to maintain switching operations during the loading process. Given the presence of V5.2 interfaces, the loading occurs such that the V5.2 communication channels are first rerouted onto the redundant system half. During this time, the new software can then be loaded into the other system half. When the loading into this system half is concluded, then it is placed in operation and all V5.2 communication channels are routed onto this system half. The new software can then be loaded into the remaining system half.

13 Claims, 4 Drawing Sheets

METHOD FOR LOADING SOFTWARE IN COMMUNICATION SYSTEMS WITH NON-REDUNDANT, DECENTRALIZED EQUIPMENT

BACKGROUND OF THE INVENTION

The invention is directed to a method for loading software into a communication system with at least two pair of central, redundantly designed equipment units allocated to one another and which respectively define one system half as well as a system half design redundant thereto.

The effective processing and controlling of pending tasks in contemporary communication systems is realized by a decentralization of intelligence. This means that programs that were stored in the central control means in earlier program-controlled systems and were executed therein—including the corresponding data—are displaced to the periphery and are processed there independently of the central control means. This, in particular, has the performance-enhancing advantage that the central control means is relieved of the control of periphery executions. However, the corresponding periphery software must then be transmitted to those peripheral equipment units and stored thereat upon commissioning of the communication system. This requirement is particularly present given a version change of the software for reasons of error elimination or for reasons of introducing new performance features, potentially after an outage or partial outage of the communication system as well.

Since contemporary communication systems are constantly expanded by new services and performance features, and the programs and data that control these must thus also be updated, greater and greater significance is accorded to changing the software of communication systems. Demands with respect to the system availability are different than those made of many other technical systems just as, for example, data processing systems are generally made of a communication system. In particular, the communication system must also be available at any time for all subscribers insofar as possible during the introduction of a new software, a demand that is indirectly made of communication systems via the dependability demands of ITU (an international standardization organization) and BELLCORE (a company which sets American Standards), but that is also directly advanced by the operating companies. For dependability reasons, the central equipment of the communication system are, in particular, redundantly designed. A communication system is therefore generally composed of at least doubled up central equipment units such as, for example, the switching network, the message distribution units as well as central control devices. All of these equipment are software-controlled single-processor or multi-processor systems. Upon commissioning of communication systems, the entire system software must be loaded both into the central as well as into the peripheral equipment. The loading of software, however, can also become necessary as a result of error corrections or the introduction of new performance features and services into the communication system. In this case, changing large parts of the entire software is generally unavoidable.

In order to do justice to the requirement of availability of the communication system for all subscribers, the change in software must occur during ongoing operation; temporary traffic limitations must thereby then be potentially accepted, whereby the non-availability of the system for individual subscribers or the non-reachability of individual subscribers or destinations must be absolutely avoided. Due to the limited redundancy and the potentially unavoidable traffic limitation, the time available for the entire change of the software is limited to a few hours; as a rule, the change is implemented at times having a light traffic load (for example, during nighttime hours). Given an unbeneficial relationship of the data quantity to be loaded and the loading rate, the peripheral equipment cannot be successively loaded for this reason, since such a procedure would take up several days of loading time under certain circumstances. In order to do justice to the requirement of adequately fast introduction of the software, for example respectively half of the peripheral equipment are simultaneously loaded. The respective other half of the peripheral equipment maintains switching-oriented operations during this time. In practice, this means an approximate 50% traffic limitation, a value that can definitely be accepted for low-traffic times. When changing the software of the communication systems, the central control means then respectively loads one half of the peripheral equipment with program information (switching-oriented, operation and maintenance and administrative programs) as well as with the data information belonging to the equipment (equipment location, signaling, authorization, telephone numbers and further individual characteristics of trunks and subscriber line circuits, as well as the expansion level and configuration of the equipment).

The program sets and datasets to be loaded into the periphery are very extensive and are undergoing great growth with the trend toward higher and higher capacity communication systems. The peripheral equipment to be loaded are thereby connected via a redundant message distribution system to the central control means that undertakes the secured transmission of the loading messages as well as the distribution of normal switching-oriented and organization and maintenance messages. Above all else, the loading times are limited by the transmission rate of the message distribution system in the direction to the periphery, but are also limited by the performance of the central control means for offering the loading information and by the transmission capacity on the interface between the central control means and the message distribution system. During the loading of the peripheral equipment or a part of the peripheral equipment, the PCM (pulse code modulation) links connected to the corresponding peripheral equipment are not available in switching-oriented terms. In particular, this applies to the PCM30 links of a local switching system that are allocated to V5.2 interfaces standardized by the ETSI/ITU.

German Letters Patent 44 22 805 discloses a method of how, given the presence of V5.2 interfaces, software is loaded into the non-redundantly designed peripheral equipment of a communication system:

One system half together with the allocated peripheral equipment is thereby first withdrawn from switching-oriented traffic. Given the presence of V5.2 interfaces, the V5.2 communication channels are rerouted onto the redundant system half. Subsequently, the new software is loaded into the system half withdrawn from switching-oriented traffic. When the loading procedure into this system half has ended, then it is placed in operation and all V5.2 communication channels are now conducted onto this system half. The new software can now be loaded into the remaining system half. What is problematical about such a procedure, however, is that the complex switching and control events required therefor must be carried out in the communication system. This potentially causes increased expense.

SUMMARY OF THE INVENTION

The invention is based on the object of specifying a simple method realizable with little development expense with which the introduction of software into the non-redundantly designed equipment of a communication system can be further accelerated and with which, at the same time, the availability of the system for the subscribers connected thereto is assured during the change in software.

According to the method of the invention, a plurality of peripheral equipment units are provided which are allocated to the one or to the remaining system half, which are connected to each of the central, redundantly designed equipment units, and which are connected to subscriber line networks via defined interfaces, a further plurality of communication channels belonging to said interfaces being conducted between the subscriber line networks and the respectively allocated peripheral equipment units of the first or second system half, one part of the further plurality of communication channels carrying useful data and the remaining part of said plurality being available for changeover to standby purposes. One of the system halves as well as the respectively allocated peripheral equipment units are placed into a defined initial condition. The communication channels that carry useful data and which are conducted from the subscriber line networks via the peripheral equipment allocated to the system half are alternately connected onto the communication channels of the peripheral equipment units allocated to the remaining system half that are available for changeover to standby purposes. Software is loaded into the system half respectively placed into the defined initial condition as well as into the respectively allocated peripheral equipment units that no longer bring communication channels carrying useful information. Redundant operation is restored after the loading of both system halves.

What is particularly advantageous about the invention is that the communication channels proceeding from the subscriber line networks are already changed over to standby in the front end of the communication system upon employment of a system split, with which they are withdrawn from the one system half and supplied to the remaining system half, as well as the peripheral equipment allocated thereto. The communication system is thus relieved of the extensive control events described in the prior art. The required programs and data can now be loaded into the one system half as well as into the allocated peripheral equipment. Subsequently, the remaining system half is disconnected and the communication channels are rerouted onto the system half already loaded with the new software. Programs and data can now be loaded into this system half as well as into the allocated peripheral equipment. At the end, redundant operation is restored. With this procedure, peripheral equipment can be loaded with software in an efficient way without thereby deteriorating the availability of the communication system for the connected subscribers, including the V5.2 subscribers.

Also according to the invention the production of the defined initial condition of the system half to be loaded first and of the peripheral equipment allocated thereto occurs by thinning out the switching-oriented traffic to be processed by the peripheral equipment allocated to this system half in that existing connections are processed for the duration of their existence, whereas new connection requests are rejected until the initial condition defined by a specific criterion has been reached. This involves the advantage that a following cleardown of the remaining connections that still exist then only effects the abort of a few connections, with which a saving of a large part of all stable connections can be achieved within the framework of changing the software of the communication system. During this thinning-out phase, new connection requests are processed only by the peripheral equipment allocated to the other system half, so that the switching-oriented availability of the communication system for all subscribers and all directions of the long-distance level is assured, albeit with certain traffic limitations caused by the reduced plurality of available voice channels.

Furthermore, with the invention the defined criterion is the reaching of a predetermined time mark or potentially of a threshold. This involves the advantage that the end of the thinning-out process can be prescribed by the independent criteria that define the reason for saving stable connections.

Also with the invention the defined initial condition of the system half to be loaded last and of the peripheral equipment allocated thereto is produced in that connections conducted over this system half are cleared down without previously thinning the switching-oriented traffic. This involves the advantage of a further acceleration of the method.

In a further development of the invention, before the cleardown of the connections conducted over this system half for achieving the defined initial condition of the system half to be loaded last and of the peripheral equipment allocated thereto, the communication channels conducted over the peripheral equipment allocated to this system half are interrupted. The further system half changes the communication channels over to standby—after a changeover to standby request on the part of the subscriber line networks—onto the peripheral equipment allocated to it, and the subscribers affected by the cleardown are transferred into the subscriber line networks in their initial condition. This involves the advantage that the cleared down, stable connections can be immediately set up again by the affected subscribers.

In another development of the invention, the switching of the system half to be loaded first and of the peripheral equipment allocated thereto into the operating condition that is active with respect to the subscriber line networks is possible by operator input. This involves the advantage that, if after the disconnect of the communication channels over the peripheral equipment of the system half to be loaded last with the new software the changeover to standby requests for the communication channels carrying useful data arrive from the subscriber line networks with a considerable time delay, a further acceleration of the method can then be achieved.

In an additional development of the invention, for restoring the redundant operation, the central equipment of the system half loaded last are disconnected and are reconnected by the controller of the further system half. This involves the advantage that the switching of these central equipment units into the redundant operating mode can be implemented with the control sequences that are already available and which were developed for the recommissioning after an outage.

Also with the invention, the changeover to standby of the communication channels carrying useful data in the defined interfaces to subscriber line networks, particularly the V5.2 interfaces, onto the peripheral equipment loaded with the new software and the allocation of the equipment provided for processing the No. 7 signaling occurs isochronically insofar as possible. This involves the advantage that the subscribers at the subscriber line networks can carry on telephone calls at any time and can be reached at any time from the long-distance level.

Furthermore, with the invention the alternate circuiting of the communication channels carrying useful data from the respectively one system half to the respectively remaining system half occurs with a least one preceding cross-connect switching means. This involves the advantage of utilizing preceding equipment of the communication system that are already present under certain circumstances, this leading to a further reduction of the needed time since a changeover to standby of the communication channels in response to a request of the subscriber line networks or of the operator is superfluous.

Also according to the invention, the allocation of communication channels to peripheral equipment as well as of peripheral equipment to a system half occurs such that, given outage of all of the peripheral equipment allocated to the one or to the remaining system half, all communications channels carrying useful data that are thereby affected are alternately routed onto the remaining peripheral equipment. This involves the advantage that no temporary, total outage of subscribers at V5.2 interfaces in view of switched or packet-oriented services or of the interface itself occurs.

Also with the invention, each of the defined interfaces, particularly of the V5.2 interfaces, of the subscriber line networks bring an approximately identical plurality of voice channels to the two totalities of peripheral equipment allocated to the system halves. This involves the advantage that a maximum traffic limitation of approximately 50% can be guaranteed during the introduction of the new software.

DESCRIPTION OF THE PREFERRED EMBODIMENTS

Figure 1:
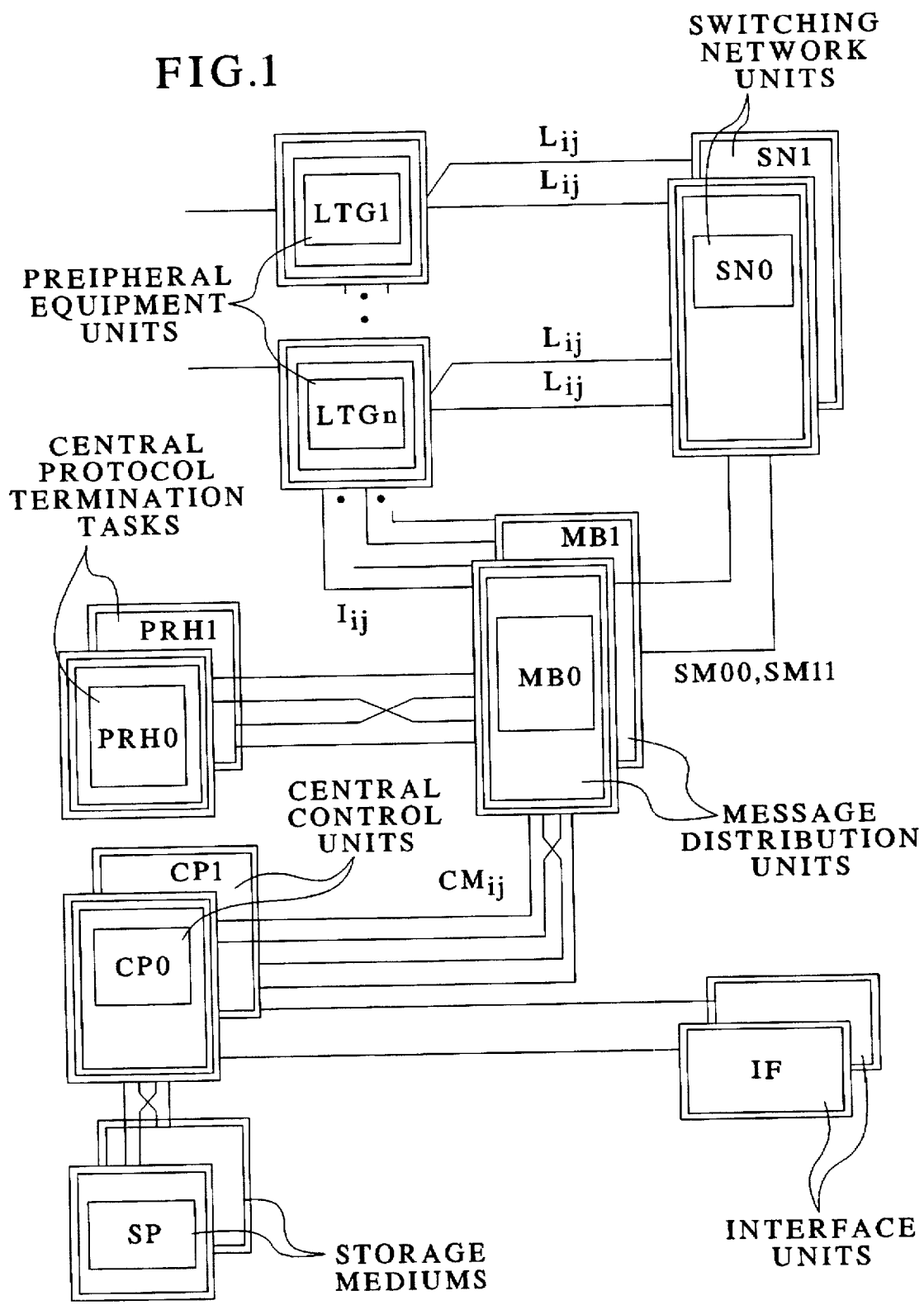
FIG. 1 shows the typical system architecture of a switching system with non-redundant peripheral equipment.
Figure 4:
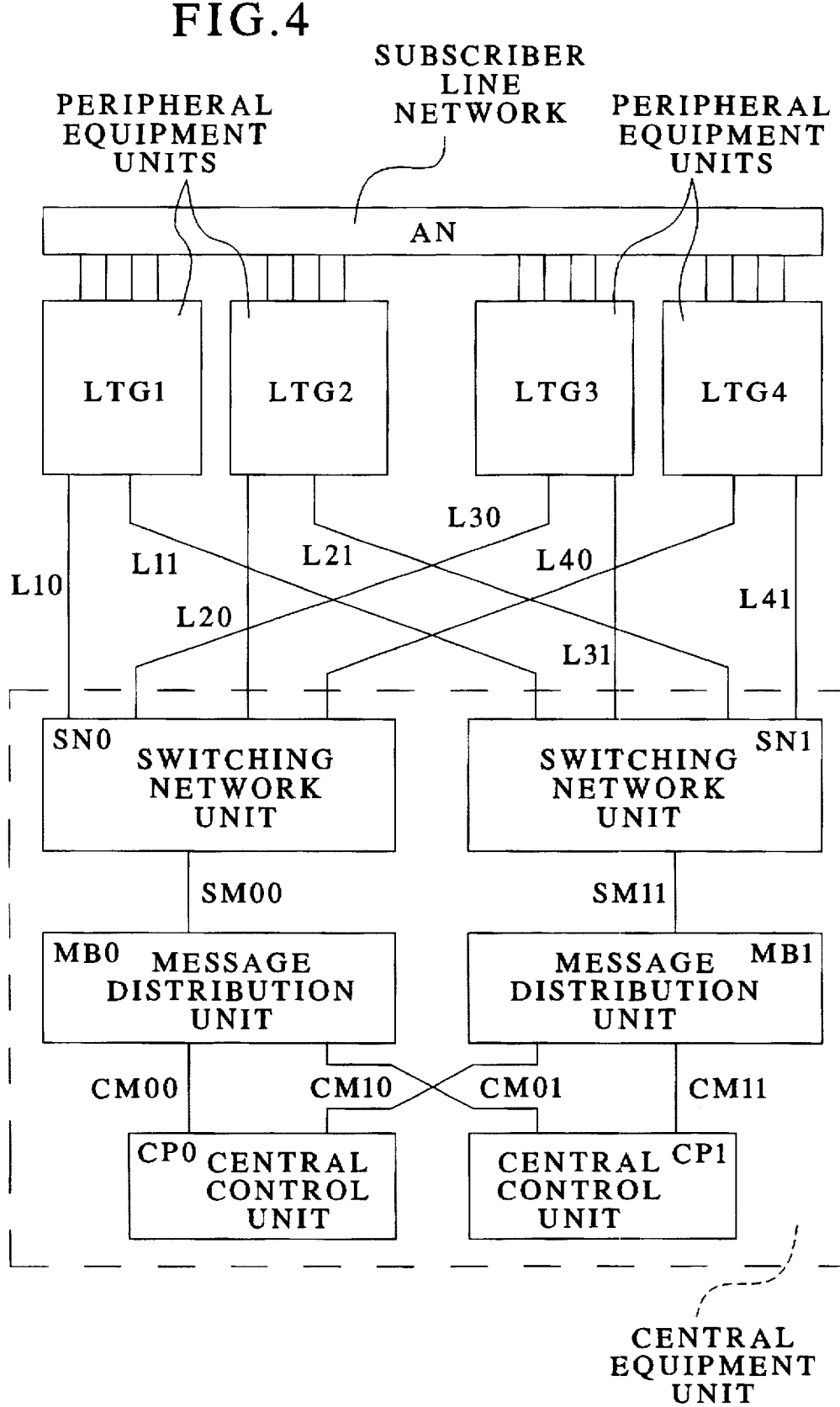
FIG. 4 shows the apparatus on which the method of the invention is executed.

FIG. 1 shows the typical system architecture of a communication system with non-redundant peripheral equipment units $LTG_1 \ldots LTG_2$. At their output side, they are connected to subscribers or further communication systems; the information proceeding from the subscribers and communication systems are received by the peripheral equipment $LTG_1 \ldots LTG_2$ and are supplied via connections Lij to the redundantly designed switching network units SN0, SN1. Furthermore, the peripheral equipment $LTG_1 \ldots LTG_2$ are connected via further connections Lij to the redundantly designed message distribution units MB0,MB1 that are in turn connected via further connections lij to, on the one hand, the redundantly designed devices for handling central protocol termination tasks PRH (for example, central character channel for No.7 signaling, access to packet networks) and, on the other hand, to the switching network units SN0,SN1 as well as to the likewise redundantly designed central control means CP0,CP1. The latter is connected to a redundant bulk storage SP. Further, interface units IF for the connection of operating elements or for alarms are provided at the central control means CP0,CP1. The switching network units SN0,SN1, the message distribution units MB0, MB1, the devices for handling central protocol termination tasks PRH0,PRH1, the central control means CP0,CP1 as well as the bulk storages SP and the interface units IF are thus respectively redundantly provided in the communication system. The peripheral equipment $LTG_1 \ldots LTG_2$, by contrast, are non-redundant in the present exemplary embodiment. Further, the switching network half SN0 is connected via connections SM00 to the message distribution unit MB0 in the same way as the switching network half MB0 is connected to the message distribution unit MB1 via connections SM11. As shown in FIG. 4, the message distribution units MB0,MB1 are in turn connected to the central control means CP0,CP1 via connections CM00 and CM11. At the same time, there is a cross-connection between the message distribution units MB0,MB1 as well as the central control means CP0,CP1 via connections CM10,CM01.

Figure 2:
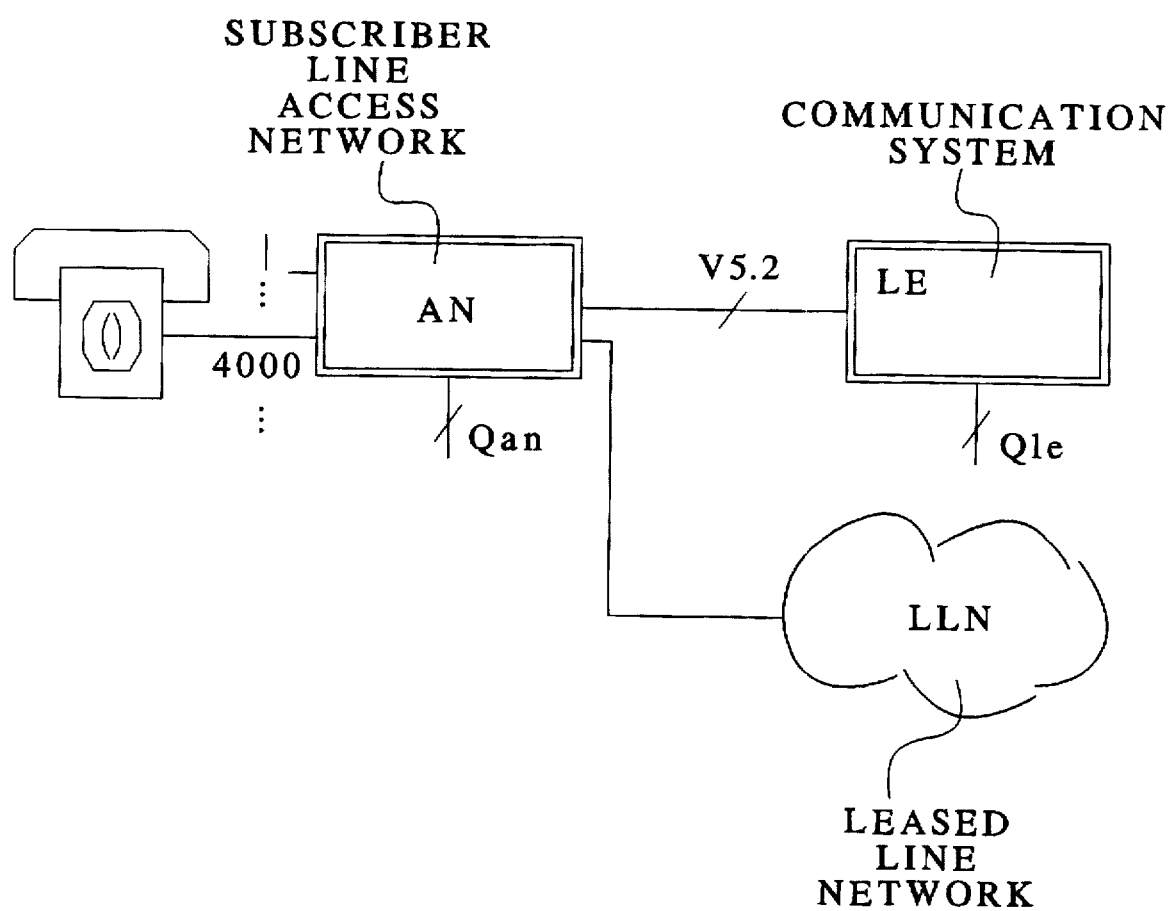
FIG. 2 shows the structure of the subscriber line network (access network) with a V5.2 interface.

FIG. 2 shows a typical configuration wherein a subscriber line network (access network) AN is connected to a communication system with a local exchange function (local exchange) LE. The access network AN thereby comprises a concentration function; given, for example, a subscriber concentration of 8:1, up to 4,000 subscribers can be connected to a V5.2 interface of an access network AN with 16 PCM30 systems. Furthermore, the access network AN can have access to a leased line network LLN and can be connected via one or more V5.2 interfaces to communication systems LE with a local exchange function. The communication system LE comprises an interface Qle and the access network AN comprises an interface Qan. The administration of the V5.2 interface and of the corresponding subscribers occurs via the interfaces Qan, Qle functionally separated over the access network AN as well as the communication system LE; the administration thereby does not occur (logically) across the V5.2 interface itself. Each V5.2 interface offers access to the communication system LE via 1 through 16 PCM30 connections. A maximum of three physical communication channels CC can thereby be established per PCM30 connection, namely in time slot 15, 16, 31. A time slot that is not used as communication channel CC is available as a bearer channel; this is especially true of time slot 16.

Figure 3:
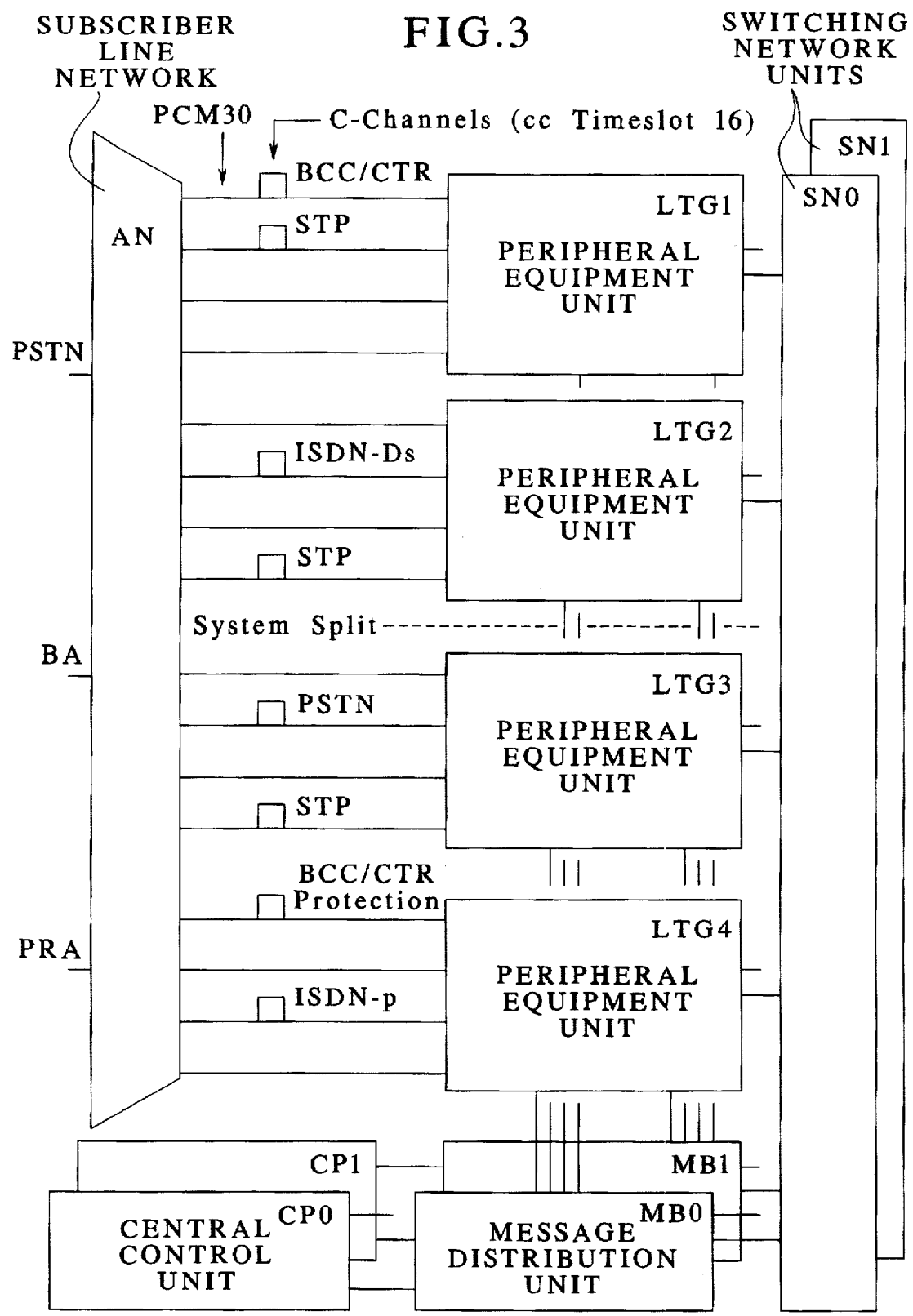
FIG. 3 illustrates the example of a V5.2 interface at a local exchange with non-redundant peripheral equipment with four respective PCM30 systems.

These conditions are shown in detail by way of example in FIG. 3 in the communication system LE with non-redundant peripheral equipment $LTG_1 \ldots LTG_2$ of four PCM30 systems each. Analog subscribers and extensions (PSTN subscribers) as well as digital subscribers and extensions (basic access BA, primary rate access PRA) are thereby connected to the access network AN. The access network AN is connected to the peripheral line units $LTG_1 \ldots LTG_4$ via four respective PCM30 systems. There are also connections of the peripheral line units $LTG_1 \ldots LTG_4$ to the switching network SN0,SN1 as well as to the message distribution units MB0,MB1. The switching-oriented and organization and maintenance cooperation of the individual equipment is determined by the control means CP0,CP1. The V5.2 -specific protocols are transmitted in the time slot 16 of specific PCM30 systems. Thus allocated, for example, are:

| | |
|---|---|
| BCC/CTR | C-channel with BCC, control and protection protocol |
| BCC/CTR | Protection C-channel with protection protocol |
| PSTN | C-channel with PSTN protocol |
| ISDN-P | C-channel with ISDN D-channel packet data |
| ISDN-DS | C-channel with ISDN signaling data |
| STB | Stand-by C-channel of the protection group 2. |

The executive sequence of the method of the invention shall be described in detail below. FIG. 4 shows the conditions of a configuration according to FIG. 3 as an initial condition before a change in software. Only the access network AN is shown therein, this being brought to the peripheral equipment $LTG_1 \ldots LTG_4$ via a V5.2 interface. In general, however, a plurality of access networks $AN_1 \ldots AN_k$ can be connected. By way of example, four respective PCM30 systems (also see FIG. 3) per peripheral equipment $LTG_1 \ldots LTG_4$ are employed for the connection of a V5.2 interface with a total of 16 PCM30 links. A switching network SN0,SN1, message distribution units MB0,MB1, as well as a central control means CP0,CP1 are also shown as central equipment of the communication system, whereby all of these latter equipment units are redundant for dependability reasons. The peripheral equipment $LTG_3$ terminates the PCM30 system (primary link) bringing the active BCC/CTR C-channel of the V5.2 interface, for which reason the function of the V5.2 master is assigned to it via the database. This means that it carries all current statuses of the V5.2 interface.

On particular, the occupations of the voice channels are deposited here. The allocation of the access network subscribers to the voice channels of the V5.2 interface is likewise implemented here. The peripheral equipment $LTG_2$ terminates the PCM30 system (secondary link) bringing the standby BCC/CTR C-channel of the V5.2 interface, for which reason all data of the master function are kept here with adequate redundancy for outage reasons. In the case of a call setup proceeding from a subscriber of the V5.2 interface, the signaling information of the subscriber is transmitted to one of the peripheral equipment units $LTG_1 \ldots LTG_4$ in a permanently allocated communication channel CC. For example, this can be the peripheral equipment $LTG_1$. Caused by the connection of this subscriber, it is then responsible for the signaling of the subscriber. On the basis of a connection, the peripheral equipment with a master function now undertakes an allocation of the peripheral equipment unit $LTG_1$, responsible for the signaling to a peripheral equipment assigned the implementation of switching tasks. The latter, for example, can be the peripheral equipment $LTG_4$. It is then responsible for the one-time setup or cleardown of this one connection.

According to FIG. 4, the peripheral equipment $LTG_1$ is connected to the switching network half SN0 via connections L10 and to the switching network half SN1 via connections L11. The peripheral equipment $LTG_2$ is connected to the switching network half SN0 via connections L20 and to the switching network half SN1 via connections L21. Below, the switching network SN0, the message distribution unit MB0 as well as the central control means CP0 define the system half 0 to which, as just disclosed, the peripheral equipment units $LTG_1,LTG_2$ are allocated for the purpose of changing the software.

The peripheral equipment units $LTG_3,LTG_4$ are connected to the central equipment in the same way. The former is brought via connecting lines L30,L31 to the switching network half SN0 or, the redundantly designed switching network half SN1. The peripheral equipment $LTG_4$ is connected via connecting lines L40,L41 to the switching network half SN0 or the redundantly designed switching network half SN1. Below, the switching network half SN1, the message distribution unit MB1, as well as the central control means CP1 define system half 1 to which, as likewise disclosed, the peripheral equipment $LTG_3,LTG_4$ are allocated for the purpose of changing the software. Further, the switching network half SN0 is connected to the message distribution unit MB0 via connections SM00 in the same way that the switching network half SN1 is connected to the message distribution unit MB1 via connections SM11. As shown in FIG. 4, the message distribution units are in turn connected to the central control means CP0,CP1 via connections CM00 and CM11. At the same time, there is a cross-connection between the message distribution units MB0,MB1 as well as the central control means CP0,CP1 via connections CM10,CM01.

FIG. 4 shows a configuration which occurs immediately before the change of software. In this case, approximately 50% of the traffic as well as, given a uniform distribution of the signaling onto the peripheral equipment $LTG_1 \ldots LTG_4$, approximately 50% of the signaling, is sequenced via the periphery half 0. Likewise, approximately 50% of the traffic as well as approximately 50% of the signaling is sequenced via the periphery half 1. Before changing the software, the redundant normal mode of the communication system prevails, i.e. both switching network halves SN0,SN1 will generally be through-connected for each connection, and the equipment MB0,MB1,PRH0,PRH1 as well as CP0 and CP1 work in their redundant mode, for example the active/standby or load sharing modes.

It shall be assumed that the system half 0 and the peripheral equipment allocated thereto, i.e. the peripheral equipment units $LTG_1,LTG_2$, are to be loaded with a new software first. This can be composed of programs and data. In this case, the traffic conducted over the peripheral equipment units $LTG_1,LTG_2$ in the redundant normal operating mode is first thinned out. This means that existing connections are still allowed, processed and cleared down as warranted, but new connections are no longer set up via this periphery half. After a certain time, only a small part of the overall traffic, for example 3% of the traffic, is then still sequenced via the periphery half 0. The periphery half 1 continues to make approximately 50% of the traffic capacity of the normal operating condition available. The waiting time for thinning the traffic can be potentially set in advance. A further development of the invention is comprised in employing a threshold that is likewise defined in advance. When this has been reached, the "thinning process" is then likewise considered ended, whereby a defined initial condition is then produced in both instances. In a further development of the invention, the thinning process can be omitted for speeding up the method for changing software.

Subsequently, the communication channels CC carrying useful data that are conducted over the periphery half 0 are switched onto the communication channels of the periphery half 1 available for changeover to standby. The switching is controlled by the central control means CP and proceeds with changeover to standby requests to the subscriber line network to be sequenced via the connected V5.2 interface. The switching-oriented residual traffic still executed by the periphery half 0 is cleared down. The peripheral equipment of the system side 0 are shut down in such a way that the PCM signals are generated undisturbed on the V5.2 interface, but the communication channels (CC) fail. Consequently, switching-oriented traffic is no longer sequenced via the periphery half 0. The undisturbed, continued existence of the PCM signals during the introduction of the new software into the switching system guarantees, in conformity with ETSI standards (V5.2 interface and Q3 standards of the V5 interfaces), that the subscriber line network does not initiate a restart of the V5.2 interface, which would involve a temporary, total outage of the entire V5.2 interface. The peripheral equipment units $LTG_1,LTG_2$ now comprise an inactive condition in switching-oriented terms. Furthermore, the old software is still loaded in the peripheral equipment $LTG_1,LTG_2$.

New software can be loaded into the peripheral equipment $LTG_1,LTG_2$ in this configuration state. For this purpose, the central control means CP0 of the system half 0 is connected to a storage medium SP, which can be designed as a floppy disk drive. Other storage media can also be optionally employed. The software to be loaded is taken from the floppy disk drive D and is supplied to the central control means CP0. From the latter, transmission occurs via the connections CM00,SM00 into the memories of the peripheral equipment units LTG$_1$,LTG$_2$. During the loading of the software into the system half 0, the switching-oriented traffic—with about 50% of the traffic capacity of the normal operating condition—is maintained by the system side 1 and the peripheral equipment LTG3,LTG4 allocated thereto. This, however, occurs employing the old software that is still present in the memories of the peripheral equipment units LTG$_3$,LTG$_4$. However, a switching-oriented non-availability of subscribers of the subscriber line network connected via the V5.2 interface does not occur. Before or within the framework of loading the peripheral equipment LTG$_1$,LTG$_2$, the loadable software parts of the central equipment SN0, MB0 and, in particular, CP0 can likewise be advantageously loaded with a new, corresponding software version.

After the new software is loaded into the memories of the peripheral equipment units LTG$_1$,LTG$_2$, the communication channels CC conducted over these peripheral equipment units are placed back into operation. These communication channels, however, are placed into the standby status, so that they continue to carry no useful data, but are available for alternate circuiting purposes. Further, the protection protocol is constructed so that the system half 0 is in the position to control C-channel alternate circuits of the subscriber line network and to process requests of the subscriber line network C-channel alternate circuits. The system half 0 is thus fundamentally fully available again for switching-oriented traffic, but does not yet process any connection requests whose origin or destination are subscribers of the V5.2 interface. In this configuration state, system half 1 is now withdrawn from the switching-oriented traffic. The peripheral equipment of the system side 1 are taken out of operation in such a way that the PCM signals are generated undisturbed on the V5.2 interface, but the communication channels fail. The existing connections conducted over the system half 1 are cleared down without prior thinning. Due to the outage of the communication channels carrying the useful data, the subscriber line network requests C-channel alternate circuits from the system half 0 that is prepared to assume switching operations. This implements the changeover to standby of all communication channels carrying useful data onto LTG$_1$,LTG$_2$ and starts the switching traffic for the subscribers at the V5.2 interface in the system half 0.

Due to the outage of the communication channels conducted over the system half 1, the connections for the subscriber line network AN conducted over the system half 1 are still considered to exist. Only the through-connection of the voice information is interrupted. For this reason, a subscriber whose connection was cleared down cannot successfully start a renewed selection attempt. The allocations of the voice channels to such subscribers that exist in the subscriber line network are therefor identified in the system half 0 and are eliminated by control requests to the subscriber line network, so that such a subscriber can again start a successful call setup—via the system half 0.

New software can be loaded into the peripheral equipment LTG$_3$,LTG$_4$ in this configuration state. For this purpose, the central control means CP1 of the system half 1 is connected to the storage medium SP, which can likewise be designed as a floppy disk drive. Other storage media can also be optionally employed here as well. The software to be loaded is taken from the floppy disk drive D and is supplied to the central control means CP1. From the latter, the transmission of the software occurs via the connections CM11,SM11 into the memories of the peripheral equipment LTG$_3$,LTG$_4$. While the software is being loaded into the system half 1, the switching-oriented traffic—with about 50% of the traffic capacity of the normal operating condition—is maintained via the system half 0. This already occurs with the new software that is already loaded in system half 0 and, in particular, into the memories of the peripheral equipment LTG$_1$,LTG$_2$. A switching-oriented non-availability of subscribers of the subscriber line network connected via the V5.2 interface, however, does not arise. Before or during the course of loading the peripheral equipment units LTG$_3$, LTG$_4$, the loadable software parts of the central equipment SN1,MB1 and, in particular CP1, can advantageously also be loaded with a new software version.

Subsequently, the central equipment SN1,MB1,CP1 that may be potentially supplied with a new software are disconnected and the peripheral equipment LTG$_3$,LTG$_4$ are connected in the system side 0 in without renewed loading of the new software version.

The system side 0 with the fill periphery complement LTG$_1$ ... LTG$_4$ offers switching-oriented traffic via the V5.2 interface. Insofar as desired, the original distribution of the communication channels carrying useful data or a distribution thereof corresponding to a default occurs onto all of the physically available communication channels. The entire system periphery is thus fully available again for switching-oriented traffic. In conclusion, the redundant mode is restored by connecting the central components SN1,MB1 and CP1 under the control of the CP0. The end of changing software has been reached; and the normal operating condition is restored.

It is provided in a development of the invention that the switching of the peripheral equipment LTG$_1$,LTG$_2$ loaded first together with the central equipment of the system half 0 into an active operating condition with respect to the V5.2 interface is possible by operator input. Such a procedure is especially advantageous when the changeover to standby request for the communication channels carrying useful data expected from the subscriber line network is not generated, or is generated with a considerable time delay.

It is provided in a further development of the invention that the V5.2 interface together with the equipment for processing the No. 7 signaling are allocated isochronically with the system side 0 working with the new software.

Furthermore, the communication channels CC can be switched from the system half 0 to the system half 1 and vice versa by a pre-connected cross-connect switch means on the basis of 64 kbit/s channels, C-channel standby circuits of the subscriber line network being superfluous as a result thereof.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for loading software into a communication system which is connected to at least one subscriber line network and wherein the communication system is formed of first and second system halves with the second system half being redundant to the first system half, comprising the steps of:

providing each of the first and second system halves with a plurality of non-redundant peripheral equipment units operating in non-redundant manner, the peripheral equipment units each connecting equipment in both of the respective system halves to the at least one subscriber line network via defined interfaces, the defined interfaces providing communication channels for carrying useful data and also being available for changeover to standby;

placing the first system half with its associated peripheral equipment units into a defined initial condition by changing communication channels after they are finished carrying useful data in the first system half over to standby and then rerouting them over to the second system half;

loading software into the first system half which had been placed into the defined initial condition, and including loading the software into the respective peripheral equipment units of the first system half;

after loading of the software into the first system half is completed, placing the communication channels in the second system half in standby and then rerouting them over to the first system half already loaded with the software;

then loading software into the second system half including into the respective peripheral equipment units of the second system half; and thereafter restoring redundant operation of the first and second system halves.

2. The method according to claim 1 wherein the production of the defined initial condition of the first system half to be loaded first and of the peripheral equipment units allocated thereto occurs by thinning out switching-oriented traffic to be processed by the peripheral equipment units allocated to the first system half by processing existing connections for a duration of their existence, new connection requests being rejected until the initial condition defined by a specific criterion is reached.

3. The method according to claim 2 wherein the specific criterion is the reaching of at least one of the parameters selected from the group consisting of a predetermined time mark and a threshold.

4. The method according to claim 1 wherein a defined initial condition of the system half to be loaded last and of the peripheral equipment units allocated thereto is produced by clearing down connections conducted over the second system half without previously thinning the switching-oriented traffic.

5. The method according to claim 4 wherein before the clear down of the connections conducted over the second system half undertaken for achieving the defined initial condition of the second system half to be loaded last and of the peripheral equipment units allocated thereto, the communication channels conducted over the peripheral equipment units allocated to the second system half are interrupted, and, after a changeover to standby request, the second system half reroutes the communication channels onto the peripheral equipment units of the first system half.

6. The method according to claim 5 wherein the switching of the first system half to be loaded first and of the peripheral equipment units allocated thereto into an operating condition that is active with respect to the at least one subscriber line network is accomplished by operator input.

7. The method according to claim 1 wherein for restoring the redundant operation, the equipment of the second system half loaded last is disconnected and are reconnected by a controller of the first system half.

8. The method according to claim 1 wherein the changeover to standby of the communication channels carrying useful data in the defined interfaces to the at least one subscriber line network onto the peripheral equipment units loaded with the new software and an allocation of equipment provided for processing signaling occurs isochronically.

9. The method according to claim 1 wherein the connecting of the communication channels carrying useful data from the first system half to the second system half occurs with a least one preceding cross-connect switching unit.

10. The method according to claim 1 wherein allocation of a communication channel to peripheral equipment units as well as of peripheral equipment units to a system half occurs such that, given outage of all of the peripheral equipment units allocated to the respective system half, all communication channels carrying useful data that are thereby affected are alternately routed onto the remaining peripheral equipment units.

11. The method according to claim 1 wherein each of the defined interfaces of the at least one subscriber line network bring an approximately identical plurality of voice channels to all of the peripheral equipment units allocated to the system halves.

12. The method according to claim 1 wherein the defined interfaces comprise V5.2 interfaces.

13. A method for loading software into a communication system which is connected to at least one subscriber line network and wherein the communication system is formed of first and second system halves with the second system half being redundant to the first system half, comprising the steps of:

providing each of the first and second system halves with redundant central equipment units and a plurality of non-redundant peripheral equipment units operating in non-redundant manner, the peripheral equipment units each connecting the central equipment units in both of the respective system halves to the at least one subscriber line network via interfaces, the interfaces providing communication channels for carrying useful data and also being available for changeover to standby;

placing the first system half with its associated peripheral equipment units into a defined initial condition by changing communication channels after they are finished carrying useful data in the first system half over to standby and then rerouting them over to the second system half;

loading software into the first system half respective peripheral equipment units;

after loading of the software into the first system half is completed, placing the communication channels in the second system half in standby and then rerouting them over to the first system half already loaded with the software;

then loading software into the second system half including into the respective peripheral equipment units of the second system half; and thereafter restoring redundant operation of the first and second system halves.

* * * * *